May 28, 1968  W. W. BINGER  3,384,951
COMPOSITE ALUMINOUS PRODUCT AND METHOD
Filed April 23, 1965

INVENTOR.
WAYNE W. BINGER
BY
ATTORNEY

United States Patent Office 3,384,951
Patented May 28, 1968

3,384,951
COMPOSITE ALUMINOUS PRODUCT
AND METHOD
Wayne W. Binger, New Kensington, Pa., assignor to Aluminum Company of America, Pittsburgh, Pa., a corporation of Pennsylvania
Filed Apr. 23, 1965, Ser. No. 450,367
4 Claims. (Cl. 29—495)

ABSTRACT OF THE DISCLOSURE

A composite aluminous metal product may be joined to another aluminous metal body by brazing, with substantial freedom from solid state diffusion of brazing alloy filler metal into the structural alloy component of the composite, by providing brazing alloy filler as part of a composite product comprising an aluminum base alloy structural component, a bonding layer of adhesive which will be dissipated below brazing temperatures, and a brazing alloy filler metal joined to the structural component by the bonding layer.

---

This invention relates to a composite aluminous metal brazing product for use in making unitary aluminous structures by brazing. The expression aluminous metal, as used herein, refers to aluminum and to aluminum base alloys, i.e. alloys in which aluminum constitutes the major portion of the composition.

The brazing of one aluminous metal body to another is an elevated temperature fusion joining process wherein a filler metal is fused but the parts being joined are not melted. In the latter respect brazing resembles soldering. The steps followed consist essentially in assembling the parts to be joined in contiguous, structure-forming relationship, with filler metal at the area of jointure, i.e. the interface between the parts where the joint is to be formed or the edge of that region, so that the filler metal can flow into the interfacial space. A suitable brazing flux is provided at the area of jointure, either applied there before any heating occurs or supplied in the course of the brazing operation as in the dip brazing process. In either case, the assembly as a whole, or at least that part where the joint is to be formed, is heated to a sufficiently high temperature to fuse the filler metal and permit it to establish a bond between the adjoining structural components, with filler metal flow and fillet formation at the joint. Following the fusion step the assembly is cooled to room temperature. The brazing process, as will be appreciated, is well adapted to forming a unitary structure in a single cycle, regardless of the number or length of joints in the assembly.

Generally, the brazing of aluminous articles is conducted within the temperature range about 1000 to 1200° F., the most suitable aluminum base brazing alloy filler metals melting within this range. The choice of brazing temperature employed in any particular case is determined by the solidus temperature of the structural components and the liquidus temperature of the filler metal.

While many aluminum base structural alloys will withstand heating to brazing temperature without melting, they usually suffer from a susceptibility to elevated temperature, solid state diffusion thereinto of brazing alloy filler metal constituent. Some may also be susceptible to loss of alloying constituent by solid state diffusion. Such susceptibilities are disadvantageous, and limit the use of conventional composite aluminous brazing products. Reference is here made to products in which a structural alloy component and a brazing alloy layer are integrally, metallurgically bonded together as is the case with conventional, roll-bonded, composite aluminum base alloy brazing sheet. In the use of such composite brazing products, one problem is that of alloying constituent from the filler metal diffusing into the structural member during heating prior to brazing. With the prolonged pre-heating necessary for large parts, heating necessary to avoid flux freezing on such parts, the brazing alloy layer is often rendered ineffective for brazing with the desired substantial fillet formation.

It is an object of this invention to provide a new and useful composite aluminous metal brazing product adapted to be joined to another aluminous metal body to produce a unitary brazed structure. Another object is to provide a composite aluminous metal product having a structural component bonded to a layer of brazing alloy filler metal, which product can be brazed without substantial solid state diffusion of brazing alloy filler metal constituent into the structural component. Another object is to provide such a composite aluminous metal product which is substantially free from solid state diffusion of constituent from one component into the other, particularly when aluminum-silicon type alloy filler metal is used. A further object is to provide such a composite aluminous metal product having a structural member joined by a relatively thin adhesive layer to a layer of brazing filler metal, such that the product can be used for brazing under conventional conditions of assembly, heating and brazing. A further object is to avoid substantial contamination of the brazed joint by adhesive residue, as well as to avoid substantial solid state diffusion of filler metal constituent into the structural component as a result of pre-heating (particularly long time pre-heating) prior to brazing.

These objects and others are attained in a composite aluminous metal brazing product wherein (a) the structural component is an aluminum base alloy susceptible to diffusion thereinto of filler alloy constituent, (b) this component is adhesively joined by a bonding layer of organic adhesive to a brazing filler metal layer, and (c) the adhesive layer provides a relatively thin interlayer of organic material which will be substantially dissipated at elevated temperatures below brazing temperatures. The interlayer may be thin; it need only be sufficiently thick to provide good joinder of the structural member and filler metal layer prior to assembly of parts for brazing.

The solidus temperature of the structural portion or core of the composite employed in accordance with the invention should be higher than the brazing temperature. Accordingly, there must be a differential between the liquidus temperature of the brazing alloy filler metal alloy and the solidus of the aluminous metal structural alloy, and that differential preferably should be at least 10° F. Such a differential can be most conveniently obtained by employing as filler metal, or brazing alloy, aluminum base alloys containing from about 2 to 15% of silicon. Such alloys may also include such other constitutents as zinc, copper and/or beryllium. The amounts may vary up to about 12% for zinc, up to about 6.0% for copper, and up to about 1.0% for beryllium. Generally, brazing temperatures in the range between about 1000 and 1200° F., depending upon the liquidus and solidus temperatures respectively of the filler and core members, may be employed, with the time of brazing adjusted to insure sufficient melting of the filler to obtain a sound fillet and joint.

The adhesive may be any organic material which has adhesive properties and will be substantially dissipated on heating at elevated temperatures below brazing temperature, without leaving residue that would impair flow and fillet formation by the brazing filler metal. Thermoplastic, resinous adhesives are particularly useful, since they will be volatilized without leaving carbon residue. Resin polymers such as polymerized acrylic resins, polyethylene, polystyrene, polyvinyl compounds, and the like, may be used.

Illustrative of composite products that may be made and used in accordance with the invention, reference is made to the accompanying drawing.

Figure 1:
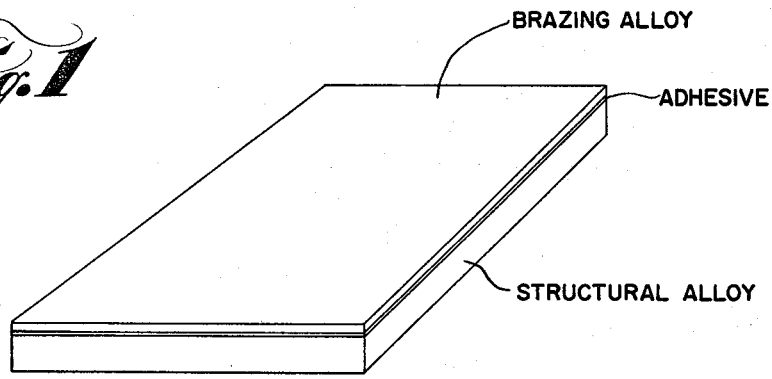
FIG. 1 is a perspective view of a composite product comprising a brazing alloy, an adhesive and a structural alloy.
Figure 2:
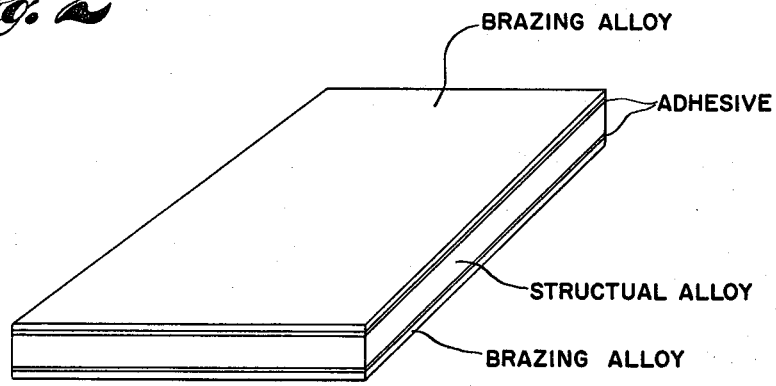
FIG. 2 is a perspective view of another composite product comprising an upper brazing alloy layer, an upper adhesive layer, a structural alloy core, a lower adhesive layer, and a lower brazing alloy layer. This latter form of product is functional for brazing on either surface as well as at its edges.

A typical, conventional, two-side, roll-clad brazing sheet may have a total thickness of .032". Such a composite sheet is often made up of a core of 3003 alloy (nominally Al-1.25% Mn) 0.026" thick, metallurgically clad on each side with an 0.003" thick layer of 713 alloy (nominally Al-7.5% Si). If such a brazing sheet is used in making brazed heat exchangers of large size, then long pre-heating times are usually required to bring the assembly to brazing temperature. With long pre-heats, much of the silicon constituent in the brazing alloy claddings is effectively lost through diffusion into the brazing sheet core. The consequence is that sufficient brazing alloy is not available to form satisfactory fillets.

In contrast to the foregoing, and as one example, a brazing sheet in accordance with the invention, but otherwise generally comparable with the conventional sheet just described, may be comprised as follows. The wrought structural core may be 3003 alloy (Al-1.25% Mn) sheet .026" thick. Two brazing alloy layers may be 713 alloy (Al-7.5% Si) foil 0.003" thick. They may be joined to the two outer surfaces of the core by thin coatings of acrylic adhesive, such as Rohm & Haas Acryloid B-82. Spray or roller coating, followed by assembly of the core and brazing layers, and application of moderate pressure (as by nip rolls) will produce the desired adhesive-joined composite sheet product.

Both the conventional and the new composite brazing sheets as just described above have been assembled, suitably clamped as plate elements between 3003 alloy fins located on either side, and brazed by flux bath brazing. Even with a pre-heat cycle of 8 hours at 1040° F., the adhesive bonded brazing sheet produced a brazed product with generous fillets, while the conventional product produced very small fillets, with noticeable skips. It was estimated that 45% of the silicon in the conventional cladding was lost through diffusion into the core, and the fillets were only about half the size of those made with the new brazing sheet.

Fabrication of long lengths of adhesive-joined composite can be accomplished economically through roller application of the adhesive onto foil filler metal claddings. This can be done by curtain coating or roller coating, both used widely in making laminated products. Immediately after adhesive is applied, the foil claddings may be heated in an oven or under a bank of radiant heating lamps to drive off the solvent vehicle. A time-temperature heating cycle can be established so that the solvent will be volatilized without causing the coating to bubble. When most of the solvent is gone, the adhesive coating is no longer tacky at room temperature. This permits coating the foil at one location and assembling a composite at another site if space is limited. A composite sheet is then made by applying the foil cladding onto part or all of a core sheet, which may be a structural alloy or a clad structural alloy, then heating the composite uniformly with radiant lamps or hot air to soften the polymer, then passing the duplex sheet through a nip roll to securely tack the components together.

The adhesive chosen for the composite product should be one that will be dissipated substantially completely, preferably leaving no carbonaceous residue, during the pre-heat prior to brazing; this has been observed to occur with the product as just described. When long, wide sheets are to be assembled, vents in the cladding layers may be provided for release of vapors without blister formation.

The composite product as described can be sheared, cut with tin snips, stamped or die-punched as desired. It exhibits good formability, so that it may be formed when that is desired for a particular brazed assembly.

Adhesive bonded brazing products made in accordance with the invention are most effective when assembled in intricate assemblies. Close fin-spacing, for example, supports the brazing alloy, particularly after the adhesive is volatilized and melting begins. However, the new product may be made up and used in many forms within the scope of the appended claims.

What is claimed is:
1. A composite aluminous metal brazing product adapted to be joined to another aluminous metal body by brazing, said product comprising
   an aluminum base alloy structural component susceptible to elevated temperature diffusion thereinto of brazing alloy filler metal constituent,
   a bonding layer of organic adhesive which will be substantially dissipated at elevated temperatures below brazing temperatures, said bonding layer extending over at least a portion of the surface of said structural component,
   a layer of aluminum base brazing alloy filler metal substantially covering said bonding layer and having a liquidus temperature below the solidus temperature of said structural component, said filler metal layer being adhesively joined to said structural component by said bonding layer,
said composite product being characterized by substantial freedom from solid state diffusion of brazing alloy filler metal constituent into the structural component as a result of heating prior to brazing, and from contamination of the brazed joint by adhesive residue upon heating and brazing.

2. A composite aluminous metal brazing sheet adapted to be joined to another aluminous metal body by brazing, said sheet comprising
   a wrought aluminum base alloy structural core that has a melting point not lower than 1000° F. and is susceptible to elevated temperature diffusion thereinto of brazing alloy filler metal constituent,
   a bonding layer of thermoplastic organic adhesive which will be substantially volatilized at elevated temperatures below 1000° F., said bonding layer extending over at least a portion of the surface of said structural core,
   a layer of aluminum base brazing alloy filler metal foil substantially covering said bonding layer and having a liquidus temperature at least 10° F. below the solidus temperature of said structural core, said filler metal foil being adhesively joined to said structural core by said bonding layer,
said composite sheet being characterized by substantial freedom from solid state diffusion of brazing alloy filler metal constituent into the structural component as a result of heating prior prior to brazing, and from contamination of the brazed joint by adhesive residue upon heating and brazing.

3. A product according to claim 2 in which the aluminum base brazing alloy filler metal contains 2 to 15% silicon.

4. The method of brazing contiguous aluminous metal parts to form a unitary structure which comprises
   providing at least one part of said structure as a composite aluminous metal brazing product having
      an aluminum base alloy structural component susceptible to elevated temperature diffusion thereinto of brazing alloy filler metal constituent,
      a bonding layer of organic adhesive which will be substantially dissipated at elevated temperatures below brazing temperatures, said bonding layer extending over at least a portion of the surface of said structural component, a layer of aluminum base brazing alloy filler metal substantially covering said bonding layer and having a liquidus temperature below the solidus temperature of said structural component, said filler metal layer being adhesively joined to said structural component by said bonding layer, assembling the parts into contiguous, structure forming relationship, providing brazing flux at the area of jointure, and heating the assembly up to brazing temperature, thereby dissipating said bonding layer and rendering the brazing filler metal sufficiently molten to effect brazing with fillet formation, whereby a unitary brazed structure is produced that is characterized by substantial freedom from solid state diffusion of brazing alloy filler metal constituent into the structural component as a result of heating prior to brazing, and from contamination of the brazed joint by adhesive residue as a result of heating and brazing.

References Cited

UNITED STATES PATENTS

| | | |
|---|---|---|
| 1,993,254 | 3/1935 | Booth. |
| 2,258,681 | 10/1941 | Hoglund. |
| 2,312,039 | 2/1943 | Hoglund. |
| 2,452,805 | 11/1948 | Sussenbach _____ 29—484 X |
| 2,653,889 | 9/1953 | Hager. |
| 2,821,014 | 1/1958 | Miller. |
| 2,833,030 | 5/1958 | Peaslee. |
| 3,040,686 | 6/1962 | Buskirk _____ 228—56 |
| 3,132,204 | 5/1964 | Giellerup _____ 174—117.6 |

CHARLIE T. MOON, *Primary Examiner.*

R. F. DROPKIN, *Assistant Examiner.*